US009273668B2

(12) United States Patent
Bjork et al.

(10) Patent No.: US 9,273,668 B2
(45) Date of Patent: Mar. 1, 2016

(54) YAW SYSTEM FOR A WINDMILL

(75) Inventors: Mikael Bjork, Karlstad (SE); Anders Wickstrom, Karlstad (SE); Christian Haag, Karlstad (SE)

(73) Assignee: General Electric Company, Schenectady, NY (US)

( * ) Notice: Subject to any disclaimer, the term of this patent is extended or adjusted under 35 U.S.C. 154(b) by 1162 days.

(21) Appl. No.: 13/254,172

(22) PCT Filed: Mar. 5, 2010

(86) PCT No.: PCT/EP2010/052863
§ 371 (c)(1),
(2), (4) Date: Sep. 1, 2011

(87) PCT Pub. No.: WO2010/100271
PCT Pub. Date: Sep. 10, 2010

(65) Prior Publication Data
US 2011/0311359 A1  Dec. 22, 2011

(30) Foreign Application Priority Data
Mar. 5, 2009  (SE) ...................................... 0950127

(51) Int. Cl.
*F03D 7/02* (2006.01)
(52) U.S. Cl.
CPC ......... *F03D 7/0204* (2013.01); *F05B 2270/329* (2013.01); *Y02E 10/723* (2013.01)
(58) Field of Classification Search
CPC ........... F03D 7/04; F03D 7/041; F03D 7/042; F03D 7/02; F03D 7/022; F03D 7/0224
USPC ........... 416/23, 27, 47, 147, 148, 170 R, 171, 416/246, 155, 159, 160, 43
See application file for complete search history.

(56) References Cited

U.S. PATENT DOCUMENTS 5,140,856 A * 8/1992 Larsen ............................ 73/455
6,320,272 B1 11/2001 Lading et al.
(Continued)

FOREIGN PATENT DOCUMENTS

CA 2668179 A1 12/2008
CN 101096941 A 1/2008
(Continued)

OTHER PUBLICATIONS

Ekelund T.: "Yaw Control for Reduction of Structural Dynamic Loads in Wind Turbines", Journal of Wind Engineering and Industrial Aerodynamics, Jan. 1, 2000.
(Continued)

*Primary Examiner* — Craig Kim
*Assistant Examiner* — Maxime Adjagbe
(74) *Attorney, Agent, or Firm* — Global Patent Operation; Douglas D. Zhang

(57) ABSTRACT

The present invention relates to a yaw system 5 for a windmill 1, the windmill comprising a tower 2 and a nacelle 3, the tower and the nacelle being joined by the yaw system and the yaw system further comprising a bearing fixed to the tower, on which bearing the nacelle rests and slides in a yawing movement, and at least one yaw motor arranged to allow the nacelle to perform a rotary motion along the bearing, wherein the yaw system 5 further comprises control means 8 for continuously operating the at least one yaw motor in such a way that the yaw motor strives to maneuver the nacelle according to a setpoint. The invention also relates to a method for controlling the yaw of a windmill 1, comprising the steps of determining a set point for the windmill 1, calculating a yaw error based on the set point and a current alignment of the windmill, determining a size and direction of a torque based at least on the yaw error, and applying the torque to at least one yaw motor of a yaw system for turning the turbine, whereby the method also comprises the step of continuously calculating the yaw error and applying the torque in order to strive towards the setpoint.

15 Claims, 3 Drawing Sheets

(56) References Cited

U.S. PATENT DOCUMENTS

| | | | |
|---|---|---|---|
| 7,175,389 B2 | 2/2007 | Moroz | |
| 7,436,083 B2 | 10/2008 | Shibata et al. | |
| 2005/0276696 A1* | 12/2005 | LeMieux | 416/61 |
| 2006/0002792 A1 | 1/2006 | Moroz et al. | |
| 2006/0070435 A1 | 4/2006 | LeMieux et al. | |
| 2008/0131279 A1 | 6/2008 | Behnke et al. | |
| 2009/0068013 A1* | 3/2009 | Birkemose et al. | 416/31 |
| 2009/0169357 A1 | 7/2009 | Slack | |

FOREIGN PATENT DOCUMENTS

| | | |
|---|---|---|
| CN | 101189430 A | 5/2008 |
| DE | 19920504 A1 | 6/2000 |
| EP | 0869280 A2 | 10/1998 |
| EP | 1302659 A2 | 4/2003 |
| EP | 1571334 A1 | 9/2005 |
| EP | 1707807 A1 | 10/2006 |
| EP | 2075561 A2 | 7/2009 |
| JP | 2006281655 A | 10/2006 |
| WO | 2008041066 A1 | 4/2008 |

OTHER PUBLICATIONS

Kung, Chris Wu et. al: "Evaluation of Classical and Fuzzy Logic Controllers for Wind Turbine Yaw Control" May 25, 1993.

Engstroem, S: "Soft Yaw Drives for Wind Turbines", Dewi Magazin, Deutsches Windenergie Institut, Wilhelmshaven, Germany, Feb. 1, 2001.

Caselitz, P. et. al.: "Reduction of Fatigue Loads on Wind Energy Converters by Advanced Control Methods", European Wind Energy Conference, Oct. 1, 1997.

Office action issued in connection with CN Patent Application No. 201080011121.6, Jun. 3, 2013.

Unofficial English translation of Office Action issued in connection with corresponding SE Application No. 0950127-1 on Apr. 27, 2011.

\* cited by examiner

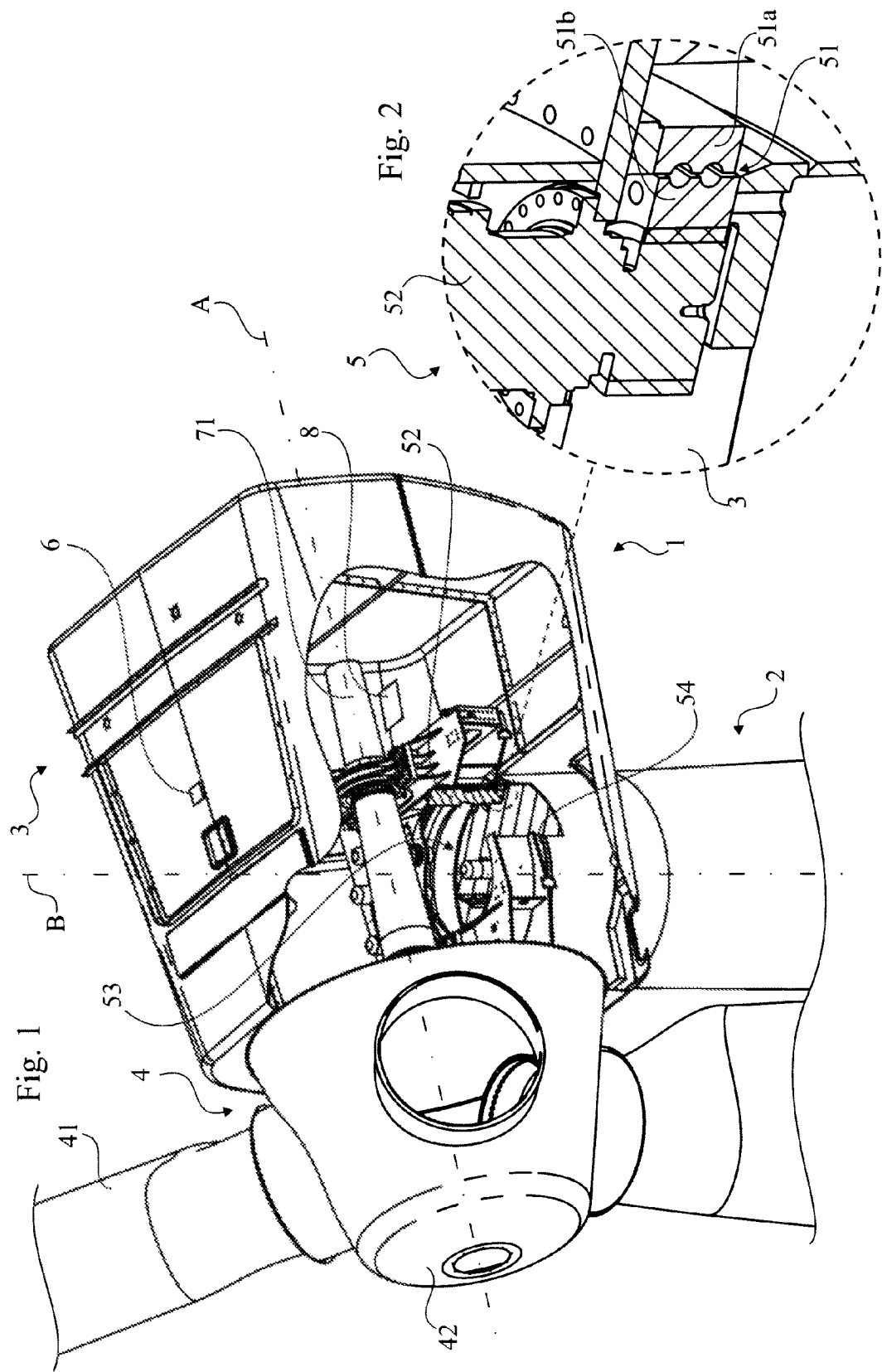

YAW SYSTEM FOR A WINDMILL

BACKGROUND OF THE INVENTION

The present invention relates to generally a yaw system for a windmill, the windmill comprising a tower and a nacelle, the tower and the nacelle being joined by the yaw system and the yaw system further comprising a bearing fixed to the tower, on which bearing the nacelle rests and slides in a yawing movement, and at least one yaw motor arranged to allow the nacelle to perform a rotary motion along the bearing. The invention also relates to a method for controlling the yaw of a windmill, comprising the steps of determining a set point for the windmill, determining a yaw error based on the set point and a current alignment of the windmill, determining a size and direction of a torque based at least on the yaw error, and applying the torque to at least one yaw motor of a yaw system for turning the turbine.

When using a windmill to generate electrical energy, it is in most cases desired to position the turbine perpendicular to the wind direction, or as close to a perpendicular position as possible. If the direction of the wind changes in such a way that the turbine is no longer perpendicular or close thereto, but rather parallel to the wind direction, a significant amount of energy is lost since the ability of the wind to cause a rotation of the blades is decreased. Also, an unsuitable wind direction causes an undesired increase of the load on the windmill and this can result in increased wear and tear, as well as an increased risk of serious damages to the components of the windmill.

It is previously known to attempt a solution to this problem, such as that shown by EP 1 571 334 (Gamesa Eolica), where a wind turbine yaw system is used to rotate the nacelle of a windmill in order to keep the turbine facing towards the wind. In order to accomplish this, a sensor detects the direction of the wind in relation to that of the nacelle onto which the turbine is mounted, and if the yaw error, i.e. the difference between these directions is too large, a yaw motor can interact with a gear ring in order to rotate the nacelle with the turbine around the tower of the windmill. When the yaw motor is not in operation, a set of yaw brakes are used to keep the nacelle in the desired position.

In order to use the yaw motor, the applied yaw brakes will have to be loosened, and the start of such a moving operation can be difficult to achieve without causing a sudden starts or undesired vibrations. One common way of avoiding this is to keep using at least one of the brakes also during use of the yaw motor, in order to provide for a more controlled motion. This requires a power of the yaw motor that is greater than that otherwise needed for the motion in itself, had no brake been applied.

Also, since the yaw system is designed to keep the nacelle fixed (stiff) in a position until a large enough yaw error is detected, all external loads are carried by the yaw brakes and the overall structure. The size of these loads is often unknown and this fact, together with the changes that occur in the loads as the strength of the wind rapidly changes, can lead to damages to the turbine and the windmill and especially to the yaw brakes as the loads are transferred to stresses in the yaw system material.

Similar systems are also shown by U.S. Pat. No. 7,436,083 (Shibata et al.) and by JP 2006-281655 (Ebara Corp.), but no reliable solutions to the problems described herein are disclosed.

There is therefore a need for a more reliable yaw system that can estimate the loads and reduce the wear and tear to the windmill and that can also increase the power generated from the windmill.

BRIEF SUMMARY OF THE INVENTION

One object of the present invention is to eliminate or at least to minimise the problems described above. This is achieved through a yaw system for a windmill according to the preamble of the appended claim 1, wherein the yaw system further comprises control means for continuously operating the at least one yaw motor in such a way that the yaw motor strives to maneuver the nacelle according to a setpoint. Thereby, the operation of the windmill can be optimised and damages to the windmill from the force of the wind minimised.

According to an aspect of the invention, the yaw motor is arranged to provide both negative and positive torque (−M, +M), respectively. Thereby, the turbine can be turned clockwise as well as anti clockwise using the same yaw system, and the yaw error can be minimised in a convenient and reliable manner.

According to another aspect of the invention, the control means is arranged to achieve four quadrant control. Thereby, a convenient and versatile control over the yaw system can be achieved and the yaw system made to be soft rather than stiff, thereby avoiding creating unnecessary stresses in the windmill itself or the yaw system.

According to yet another aspect of the invention, at least one yaw motor property from the four quadrant control is arranged to use the control means to control a pitch angle of at least one turbine blade of the turbine. Thereby, the load on the turbine can be decreased and the possible energy yield from the generator increased. If more than one turbine blade is used with the windmill, the pitch angle of the blades can be controlled individually, thereby enabling pitch angle adjustments corresponding to an optimal position of the blades with respect to the surrounding conditions.

According to a further aspect of the invention, the control means is arranged to detect unbalances to the turbine using at least the at least one yaw motor property. Thereby, any factors contributing to increasing the load or decreasing the energy output that is available from the system can be detected, and the system can be used to minimise these unbalances in order to further optimize the operation of the windmill.

According to another aspect of the invention, the control means is further arranged to determine wind conditions such as wind speed, wind direction, wind shear or upflow, based at least on the yaw motor property. Thereby, the yaw system can be used for determining the surrounding conditions in an easy and reliable way.

According to a further aspect of the invention, the control system is arranged to react by activating an alarm function if the detected unbalances exceed a predetermined value. Thereby, the windmill can be shut down if the risk for damages due to unbalanced turbine is too large, or an alarm signal can be generated, signalling that maintenance is needed.

BRIEF DESCRIPTION OF THE DRAWINGS

The invention will now be described in more detail with reference to the appended drawings, wherein:

FIG. 1 shows a perspective view of a windmill comprising a yaw system according to a preferred embodiment of the invention, FIG. 2 shows a cross-sectional perspective view of a section of the yaw system of FIG. 1.

DETAILED DESCRIPTION

Figure 3:
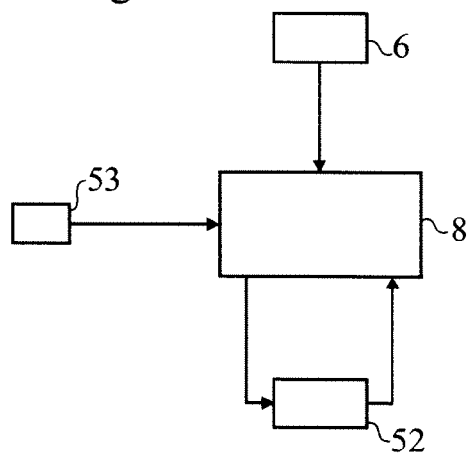
FIG. 3 shows a schematic view of the operation of the yaw system according to FIGS. 1 and 2.

FIG. 1 shows a windmill 1 with a yaw system 5 according to a preferred embodiment of the invention, where a tower 2 that is firmly mounted on the ground is joined to a nacelle 3 that houses an electrical power generator 7 (not shown). The power generator 7 comprises a generator with a shaft 71 that can be made to rotate around an axis A along the length of the nacelle 3, and onto this shaft 71 is mounted a turbine 4 with a hub 42 where at least one, preferably two or three turbine blades 41, in turn are mounted. When the nacelle 3 is adjusted so that the turbine 4 faces the approximate direction of an oncoming wind, the wind interacting with the turbine blades 41 can cause a rotation of the turbine 4 and result in electrical power being generated by the generator 7 and transferred to a power grid or stored in a suitable storage means (not shown).

The term turbine used herein is to be interpreted as a hub 42 including at least one blade 41 and designed to rotate around an axis in order to generate an electrical power at a power generator 7 or other suitable device for using the rotational energy thus created. The rotational movement itself is mainly effected through the influence of a wind.

In order for the direction of the turbine 4 to be adjusted, the nacelle 3 can rotate around an axis B that extends along the length of the tower 2, i.e. from the ground and substantially vertically upwards as indicated in FIG. 1. The rotation is effected by a yaw system 5 that is placed at the join between the tower 2 and the nacelle 3, and comprises a yaw bearing 51b that is mounted on the tower 2 and arranged to interact with a bearing 51a mounted on the nacelle 3. As a result, a sliding rotary motion is made possible, where the nacelle 3 can turn around the axis B. A sliding track 54 can also be provided at the yaw system 5 for further enabling the yaw motion.

The sliding motion is created by at least one, but preferably 2-6 yaw motors 52, mounted on the nacelle 3 and arranged to interact with the yaw bearing 51 of the tower 2 in such a way that the sliding motion can be controlled. The at least one yaw motor 52 can act with a torque M that is smaller than or equal to a maximum torque $M_{max}$. At least one yaw sensor 53 is mounted adjacent to the yaw system and is arranged to detect at least one feature, such as yaw position, angular velocity or acceleration, of a point on or adjacent to the yaw system.

Also provided are wind sensor means 6 that can be mounted on the nacelle 3, and that can detect features of the wind at the site of the windmill 1. A control system 8 placed inside the nacelle 3 is arranged to control the yaw system and other features of the operation of the windmill 1.

FIG. 2 shows a cross-sectional perspective view of a part of the yaw system 5, with a yaw motor 52 mounted on the nacelle 3 and cooperating with the yaw bearing 51 in such a way that one section 51b, that is mounted onto the tower 2, and another section 51a, that is mounted on a main frame and yaw motor 52 itself, can move in relation to each other, thereby creating the sliding motion of the nacelle 3 with respect to the tower 2.

In FIG. 3, the operation of the yaw system 5 is shown, whereby the control system 8 is arranged to receive input data from the wind sensor 6 with regards to the strength and direction W of an oncoming wind, and for the yaw sensor 53 with regards to the position, velocity and/or acceleration of a point that is affected by the operation of the yaw system 5, as mentioned above. The point can be placed on the circumference of the outer bearing 51a, adjacent to a yaw motor 52, or on another suitable location such as inside the nacelle 3. The control system 8 also receives input data from the yaw motor 52 itself regarding the current motor torque M and other operating conditions, and gives instructions to the yaw motor 52 as output data. The output data can comprise an instruction regarding the magnitude of the desired motor torque M and the desired direction of movement of the nacelle 3 with respect to the tower 2.

The optimal operation of the windmill 1 is achieved as the nacelle 3 with the turbine 4 are turned to point in a specific direction, herein referred to as the yaw setpoint. This direction can be determined by detecting the wind direction or other factors that are deemed to be relevant. An example of a yaw setpoint can be to achieve an orientation of the plane of the turbine 4, i.e. the plane comprising the turbine blades 41, perpendicular to the wind direction. The yaw setpoint may also be a value corresponding not to a specific alignment but to other properties of the yaw system, such as for instance the yaw speed, the yaw acceleration or the yaw torque.

After deciding upon the yaw setpoint, the actual direction of the turbine 4 is compared with the setpoint and the difference is determined as the yaw error. The yaw system 5 continuously applies a torque M at the at least one yaw motor 52 in order to minimise this yaw error and turn the nacelle 3 and turbine 4 towards the yaw setpoint. The yaw setpoint can be continuously monitored and re-calculated at any given time, in order to keep the setpoint up to date as the wind direction or wind strength changes, and the system 5 continuously strives to minimise the yaw error and reach the yaw setpoint.

Figure 4:
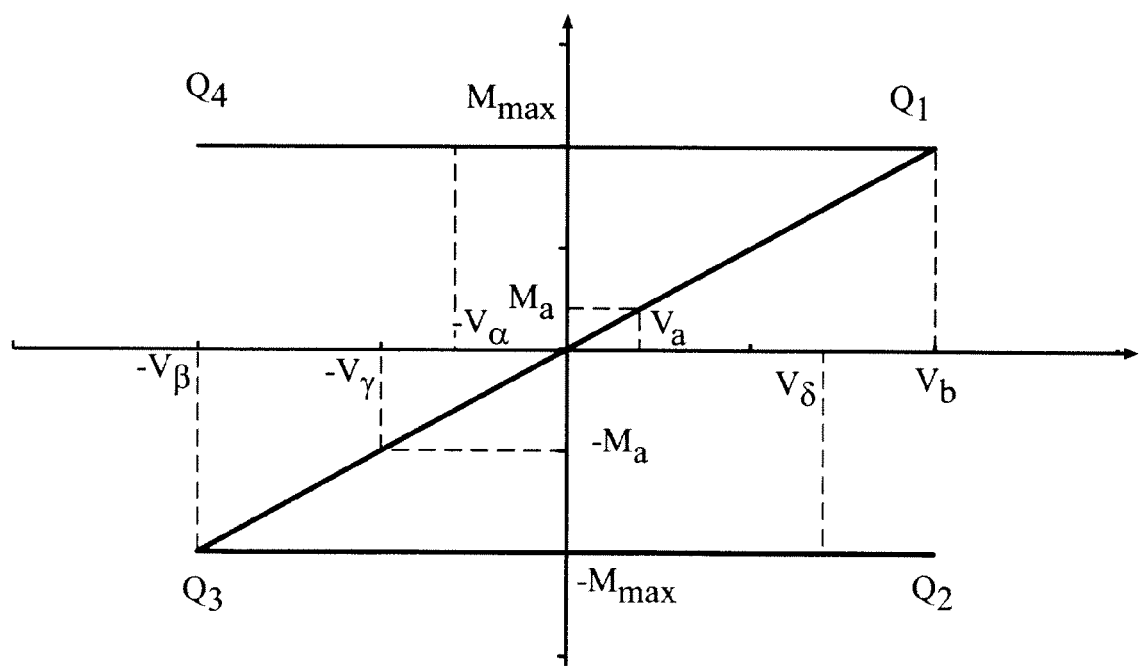
FIG. 4 shows a diagram of the motor torque M of the yaw motors of the yaw system with respect to the angular velocity V of the turbine blades of the windmill.

FIG. 4 shows a diagram of the motor torque M of the yaw motor or yaw motors 52 with respect to the angular velocity V of the nacelle 3, according to a method of four quadrant control. The torque M can be positive or negative, i.e. be directed in the counter clockwise or clockwise direction, respectively, depending on the direction of movement needed in order to align the turbine 4 with the wind. An example of the desired position at the setpoint, when the direction D of the hub 42 is aligned with that of the wind W, is shown schematically in FIG. 5a. The actual setpoint may in some cases be another than that where the turbine 4 is perpendicular to the wind.

Figure 5A:
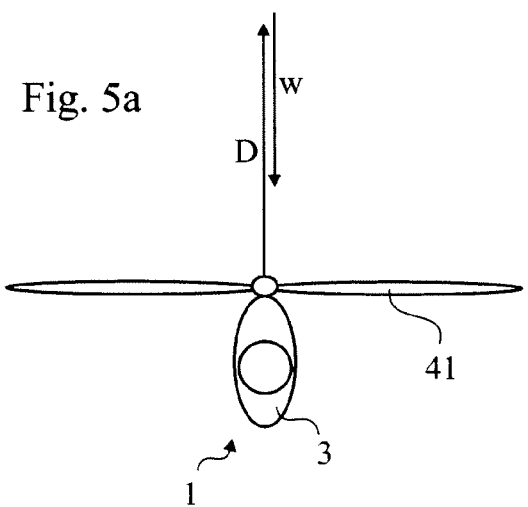
FIG. 5a shows a schematic view from above of a desired position of an upwind windmill with respect to the direction of the wind.
Figure 5B:
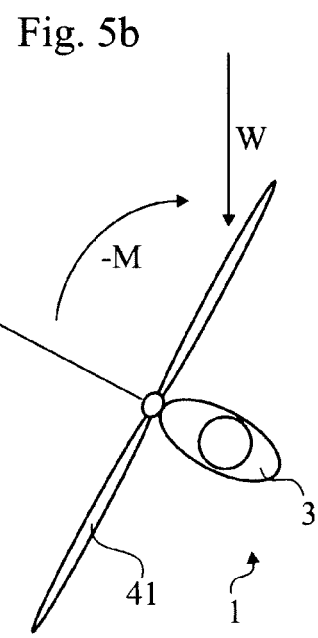
FIG. 5b shows a schematic view from above of a position of an upwind windmill needing correction in the clockwise direction.
Figure 5C:
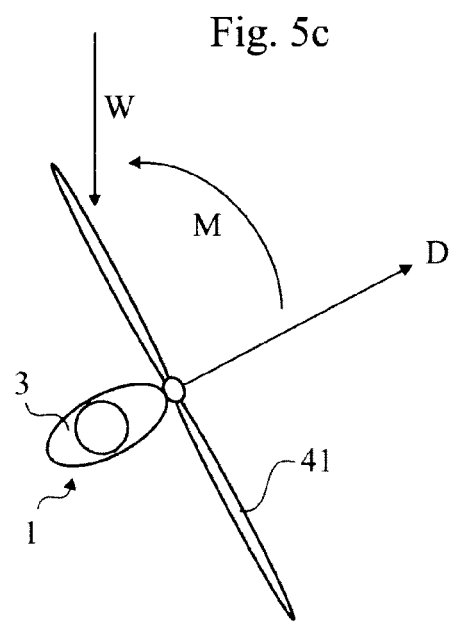
FIG. 5c shows a schematic view from above of a position of an upwind windmill needing correction in the counter clockwise direction.

FIG. 5a-5c indicate different positions of the nacelle 3 of the windmill 1 with respect to a direction W of an oncoming wind. It is assumed that the chosen setpoint is when the direction D of the turbine 4 and the nacelle 3 is along the line W of the wind direction.

If movement in a counter clockwise direction is required, as indicated by FIG. 5c where a rotation in this direction is required in order to face the wind W, a positive torque $M_a$ can be applied to the yaw system, corresponding to an angular yaw velocity of $V_a$ of the nacelle 3 shown in the first quadrant, Q1, of the diagram of FIG. 4. If the torque is increased towards a maximum of $M_{max}$, the resulting angular velocity is also increased, resulting in an angular velocity of $V_b$. The absolute value of the velocity can depend on factors such as the force of the wind or the pitch angle of the blades 41, as well as the direction of the nacelle 3.

When altering the pitch angle of the turbine blades 41, a collective pitch control might be used for altering the pitch of more than one blade 41 collectively, while an individual pitch control is used to alter the pitch of only one blade 41. Collective pitch control is mainly used in order to alter the amount of energy captured from the wind, while individual pitch control is used to provide yaw torque or counteract an unbalance in the turbine 4, among others. By using an offset, i.e. an individual pitch angle alteration, this unbalance can be minimised, as is described further below.

If movement in a clockwise direction is required, as indicated by FIG. 5b where a rotation in this direction is required in order to face the wind W, a negative torque $-M_a$ can be applied, resulting in an angular yaw velocity $-V_\alpha$, of the nacelle 3, and an increase of the negative torque towards a maximum value, $-M_{max}$, would result in an angular yaw velocity $-V_\beta$ of the nacelle 3. This is shown in the third quadrant, Q3, of the diagram of FIG. 4. The absolute value $|V|$ of the velocity still depends on various factors, as well as the direction of the hub 42, and as a consequence of this, $|V_a|$ is generally not equal to $|-V_\alpha|$, and $|V_b|$ is generally not equal to $|V_\beta|$.

Under some conditions, for instance in very strong wind, a torque larger than $|M_{max}|$ would be required for rotating the nacelle 3. In these cases, the maximum torque $M_{max}$ or $-M_{max}$, respectively, can be applied and try to push the nacelle 3 towards the wind. The resulting motion, however, is directed in the opposite direction due to the surrounding conditions. Thus, the result can be an increasing in the yaw error, and is displayed as a velocity $-V_\gamma$ in the fourth quadrant Q4 of the diagram or the velocity $V_\delta$ in the second quadrant Q2, respectively. The yaw system 5 thereby allows the nacelle 3 to divert from the yaw setpoint whenever external yaw wise torque on the nacelle 3 exceeds an allowed yaw motor capacity, i.e. when the maximum torque $M_{max}$ or $-M_{max}$, respectively is applied. This yaw motion away from the yaw setpoint is thereby counteracted by a yaw motor torque M.

As the nacelle 3 is pushed away from the desired direction, the force on the blades 41 is decreased, since the change in direction also changes the angle of attack of the blades 41 with respect to the direction W. Thus, a position is reached where the force of the wind and the maximum torque $M_{max}$ are balanced and where the nacelle 3 can be kept steady until the wind changes. The torque $M_{max}$ is in this operation used to counteract the deviation from the setpoint and continue to strive towards the setpoint. During such operation, the loads on the system from the wind are smaller than would be the case if a stiff yaw system were used, since the yaw system now being soft and being able to yaw from the wind if the force of the oncoming wind is very strong actually protects the windmill 1 from excessive loads that would otherwise cause stresses or damages to the yaw system 5 or the turbine 4.

These operations, when the rotation of the nacelle 3 is to be found in the quadrants Q2 or Q4, the yaw motors 52 are actually working as generators. This means that operation in Q2 and Q4 generates power. This power can either be dissipated in resistors, stored in an accumulator, or entered back into the grid or power supply that normally powers the yaw motors. As operation in Q2 and Q4 dissipates power, the yaw system is, from a mechanical point of view, working as a damper. This damper effect is favorable as the magnitudes of motion and loads are decreased.

In extreme wind speeds above a predetermined level or under other extraordinary conditions, the motor operation in Q1 and Q3 is stopped by the control system 8. The desired speed of the nacelle yaw rotation is zero, and under these conditions, operation in Q2 and Q4 is allowed only. The result of this mode of operation is that the nacelle 3 will find a yaw position where external yaw torque finds a minimum. This position might be down wind as well as upwind or any yaw position, and thanks to this mode of operation the loads on the overall structure is diminished, thereby also diminishing the risk for damages to the windmill or the yaw system 5.

The operation of the yaw system will now be described with reference to the figures.

The control system 8 (see FIG. 3) controls the yaw system, as has previously been described, with the yaw motor or yaw motors 52 in order to reach the desired direction shown by FIG. 5a, and the yaw motors 52 are used continuously in order to strive towards and/or maintain this position. The wind sensor 6 monitors the direction of the wind and communicates this to the control system, which also receives input from the yaw sensor 53 that detects the current position of the nacelle 3 and the rotational speed (direction and velocity) and/or corresponding acceleration of the nacelle 3. Using these inputs, the control system 8 decides which torque M is suitable at that particular time, and communicates this to the yaw motor or yaw motors 52. The yaw process is continuous, and the control system 8 alters the torque M as needed in order to rotate the nacelle 3 and minimize the yaw error. From the yaw motor 52, data regarding the torque M and other relevant properties at any given time is continuously given as feedback to the control system 8.

When a yaw error is detected, i.e. when a direction D of the nacelle 3 differs from the setpoint, i.e. the direction of the wind W, for instance, as is depicted in FIG. 5b, the control system 8 detects this by processing the data from the wind sensor 6 and the yaw sensor 53, and determines the yaw error itself along with the rotational direction in which a movement is desired in order to reduce the yaw error. In FIG. 5b, this desired rotational direction is clockwise, and a torque $-M$ in this direction is applied in order to create a rotation. The actual movement can be closely observed by monitoring the present position of the nacelle 3 as well as the speed in which it rotates and the acceleration of the rotation. Thereby, the torque can be adapted in order to create a controlled and efficient movement, to add extra force if needed or to decrease the torque and thereby act as a brake on the rotation as the desired position is reached in order to avoid an excessive movement past the alignment of the directions D, W and cause the need of a new correction from the opposite direction. Alternatively, only the direction required for rotating the nacelle 3 in order to reach the setpoint is calculated and not the magnitude of the total yaw error.

Each time a turbine blade 41 passes in front of the tower 2, there is a periodical impact on the mechanical structure. With the soft and active yaw system 5 described herein, a small periodical yaw motion is detected which is dampened by the active yaw control. This presents a significant improvement compared to the prior art, since the corresponding periodical impact in previously known windmills is not dampened but creates stresses in the material of the tower and especially in the turbine and the yaw system.

Thereby, a monitoring of these data along with the actual torque $-M$ from the yaw motor or yaw motors 52 enables the control system 8 to adapt and control the different aspects of the rotation.

When the desired position shown in FIG. 5a is reached, the yaw motor or motors 52 are used to maintain this position by using an appropriate torque M in the necessary direction in order to compensate for changes in the conditions affecting the windmill 1, such as the direction and strength of the wind, that would otherwise push the nacelle 3 away and create an undesired yaw wise rotation away from the position. Thereby, the optimal position can be maintained once it has been reached and the power generated from the windmill can be maximised.

Under certain conditions, for example during high wind speed, as has been mentioned above, the maximum torque $M_{max}$ or $-M_{max}$ is not sufficient to rotate the nacelle 3 in the desired direction, but by continuously applying this torque the windmill can be kept steady in as good a position as possible, i.e. as close to the desired position of FIG. 5a as can be achieved.

Since no brakes are needed for maintaining the position, excessive wear and tear to the braking system can be avoided, and by monitoring the factors described above in conjunction with the control system 8, the system can detect the amount of force that the turbine blades 41 and the rest of the windmill 1 are subjected to. If this force is large enough to cause damages to the system, this can be used as a reason for turning off the power generation system, thereby reaching normal shut down procedures (cut out), or for altering the pitch of the turbine blades 41 in order to lessen this force and enable the yaw system to rotate the nacelle 3 towards a better position. Also, other factors such as a yaw error of a certain magnitude or the constant increase of the yaw error even if the maximum torque $M_{max}$ is used, can also be used for determining if the system needs to be shut down for safety reasons or if different blade pitch or other changes are enough to keep the forces to which the windmill 1 is subjected within a reasonable range. The previously known way to detect cut out conditions is by using a wind speed sensor and decide upon shut down based mainly on this information. Thanks to the present invention, however, it is possible to operate the turbine 4 in higher wind speeds if the loads are low enough, and the decision to shut down the windmill 1 if necessary can be based on a combination of the detected wind speed and the state of the yaw system 5, mainly the motor torque M applied by the yaw motors 52.

Thanks to this, brakes used with the yaw system 5 can be kept for emergencies or unusual circumstances, and since the wear or damages on the brakes can be kept to a minimum, the need for repair is substantially lower than with conventional systems. Also, since the brakes are not worn down through ordinary use, the reliability of the braking system is increased.

The properties of the yaw motor, such as torque, angular velocity, current, voltage, frequency and the like, can be used to detect unbalances in the turbine 4. These unbalances can for instance be due to incorrect pitch of an individual turbine blade 41, damages to the blades 41 from excessive loads on the windmill 1 or from lightning strikes or other unexpected events, or from the formation of ice on the turbine blades 41 during winter time. If the unbalances are small, they can be corrected by altering the individual pitch of a single blade 41, but if the unbalances are large enough, correcting them might not be possible and there might arise a risk for serious damage to the windmill 1 itself. In this case, an alarm function can be initialised, taking control over the operation of the windmill 1 an initialising procedures to limit the possible damages. For instance, an alarm signal can be emitted in order to signal that maintenance is required, and the turbine 4 can be shut down completely or be kept operating at a lower speed, as is deemed suitable at the time, while waiting for a maintenance crew to arrive.

The invention is not limited by the preferred embodiments described above, but can be varied within the scope of the appended claims, as will be readily understood by the person skilled in the art. For instance, the components described above, such as the control system, sensor means, etc. can be placed at different locations at the windmill and can communicate with each other by any suitable means. The yaw sensor can also be integrated with the yaw motor or motors and the internal processes of the control system can differ from those described above. Yaw motors can be provided on the tower as well as on the nacelle, and the method for establishing a yaw setpoint can differ from that described with reference to the preferred embodiments.

Various aspects and embodiments of the present invention are defined by the following numbered clauses:

1. A yaw system for a windmill, the windmill comprising a tower and a nacelle, the tower and the nacelle being joined by the yaw system, wherein the yaw system comprises:
    a bearing fixed to the tower, on which bearing the nacelle rests and slides in a yawing movement;
    at least one yaw motor configured to allow the nacelle to perform a rotary motion along the bearing; and
    a control for continuously operating the at least one yaw motor in such a way that the at least one yaw motor maneuvers the nacelle towards a setpoint,
    wherein the yaw system is configured to allow the nacelle to divert from the setpoint whenever an external yaw wise torque on the nacelle exceeds an allowed torque capacity of the at least one yaw motor.

2. The yaw system according to claim 1, wherein the at least one yaw motor is configured to provide both negative and positive torque, respectively.

3. The yaw system according to claim 1, wherein the control is configured to achieve four quadrant control.

4. The yaw system according to claim 3, wherein at least one yaw motor property from the four quadrant control is used to control a pitch angle of at least one turbine blade of a turbine or the turbine itself.

5. The yaw system according to claim 1, wherein the yaw system is configured to control the pitch angle of at least two turbine blades independently from each other.

6. The yaw system according to claim 1, wherein the control is configured to detect unbalances to a turbine using at least one yaw motor property.

7. The yaw system according to claim 6, wherein upon detection of the unbalances, the control is configured to minimize the detected unbalances by altering the pitch angle of at least one turbine blade.

8. The yaw system according to claim 1, wherein the control is further configured to determine a direction of the nacelle that is the most favorable with respect to conditions affecting the windmill, using at least one yaw motor property.

9. The yaw system according to claim 1, wherein the control is further configured to determine wind conditions such as wind speed, wind direction, wind shear or upflow, based on at least one yaw motor property.

10. The yaw system according to claim 6, wherein the control system is configured to react by activating an alarm function if the detected unbalances exceed a predetermined value.

11. A method for controlling the yaw of a windmill, the method comprising:
    determining a set point for the windmill;
    determining a yaw error based on the set point and a current alignment of the windmill;
    determining a size and direction of a torque based at least on the yaw error;

applying the torque to at least one yaw motor of a yaw system for turning the turbine;

continuously calculating the yaw error and applying the torque in order to maneuver towards the set point; and using the yaw system to allow the nacelle to divert from the set point if an external yaw wise torque on the nacelle exceeds an allowed torque capacity of the at least one yaw motor.

12. The method according to claim 11, further comprising achieving four quadrant control in order to control the yaw system.

13. The method according to claim 12, wherein a yaw motor torque feedback from the four quadrant control is used to control a pitch angle of at least one turbine blade of the turbine.

14. The method according to claim 11, wherein the yaw system controls the pitch angle of at least two turbine blades independent from each other.

15. The method according to claim 11, wherein a yaw motor torque feedback is used to detect unbalances to the turbine.

\* \* \* \* \*